US006795429B1

(12) United States Patent
Schuster et al.

(10) Patent No.: US 6,795,429 B1
(45) Date of Patent: Sep. 21, 2004

(54) SYSTEM AND METHOD FOR ASSOCIATING NOTES WITH A PORTABLE INFORMATION DEVICE ON A NETWORK TELEPHONY CALL

(75) Inventors: Guido M. Schuster, Des Plaines, IL (US); Ronnen Belkind, Chicago, IL (US); Ikhlaq S. Sidhu, Vernon Hills, IL (US); Jacek A. Grabiec, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/406,151

(22) Filed: Sep. 27, 1999

(51) Int. Cl.[7] ............................................... H04L 12/66
(52) U.S. Cl. ....................................... 370/352; 370/493
(58) Field of Search ................................. 370/351–358, 370/401, 402, 420, 463, 465, 466, 467, 471, 437, 493–495

(56) References Cited

U.S. PATENT DOCUMENTS

| | | | |
|---|---|---|---|
| 4,313,035 A | 1/1982 | Jordan et al. | |
| 4,953,198 A | 8/1990 | Daly et al. | 379/61 |
| 5,448,623 A | 9/1995 | Wiedeman et al. | |

(List continued on next page.)

FOREIGN PATENT DOCUMENTS

| | | |
|---|---|---|
| DE | 198 13 179 A 1 | 9/1999 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 99/45687 | 3/1998 |
| WO | WO 98/16051 | 4/1998 |
| WO | WO 98/30008 | 7/1998 |
| WO | WO 98/37665 | 8/1998 |
| WO | WO 99/35802 | 1/1999 |
| WO | WO 99/12365 | 3/1999 |
| WO | WO 99/19988 | 4/1999 |
| WO | WO 01/05078 A2 | 7/2000 |

OTHER PUBLICATIONS

"Understanding Packet Voice Protocols"; The International Engineering Consortium; http://www.iec.org.
Hansson, Allan et al., *Phone Doubler—A Step Towards Integrated Internet and Telephone Communities*, Ericsson Review, No. 4, 1997, pps. 142–152.
Zellweger, Polle T. et al. *An Overview of the Etherphone System and Its Applications*, Xerox Palo Alto Research Center (Mar. 1988), pps. 160–168, XP 000617541.

(List continued on next page.)

*Primary Examiner*—Wellington Chin
*Assistant Examiner*—Brenda Pham
(74) *Attorney, Agent, or Firm*—McDonnell Boehnen Hulbert & Berghoff

(57) ABSTRACT

A system and method for associating notes to a call with a portable information device, such as a personal digital assistant. In one embodiment, notes taken during a call are associated with information about the call, such as parties to the call, the date and time, and the subject matter of the call. Notes taken may include user input or PID data communicated across a telephony network, for example. In one embodiment, a portable information device links to a data network telephone to initiate a phone call. Information about the phone call is stored with notes taken to allow for later retrieval.

29 Claims, 10 Drawing Sheets

U.S. PATENT DOCUMENTS

| | | | |
|---|---|---|---|
| 5,497,339 A | 3/1996 | Bernard | 364/705.05 |
| 5,557,658 A | 9/1996 | Gregorek et al. | 379/67 |
| 5,563,937 A | 10/1996 | Bruno et al. | |
| 5,606,594 A | 2/1997 | Register et al. | 379/58 |
| 5,646,945 A | 7/1997 | Bergler | |
| 5,727,057 A | 3/1998 | Emery et al. | 379/211 |
| 5,732,074 A | 3/1998 | Spaur et al. | |
| 5,732,216 A | 3/1998 | Logan et al. | |
| 5,742,905 A | 4/1998 | Pepe et al. | 455/461 |
| 5,838,665 A | 11/1998 | Kahn et al. | 370/260 |
| 5,850,433 A | 12/1998 | Rondeau | 379/201 |
| 5,875,405 A | 2/1999 | Honda | |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | |
| 5,933,778 A | 8/1999 | Buhrmann et al. | 455/461 |
| 5,938,757 A | 8/1999 | Bertsch | |
| 5,960,340 A | 9/1999 | Fuentes | |
| 5,970,059 A * | 10/1999 | Ahopelto et al. | 370/338 |
| 5,991,394 A | 11/1999 | Dezonno et al. | |
| 6,006,272 A | 12/1999 | Aravamudan et al. | |
| 6,020,916 A | 2/2000 | Gerszberg et al. | |
| 6,031,904 A | 2/2000 | An et al. | |
| 6,044,403 A | 3/2000 | Gerszberg et al. | |
| 6,052,369 A * | 4/2000 | Hamalainen et al. | 370/389 |
| 6,075,992 A | 6/2000 | Moon et al. | |
| 6,084,584 A | 7/2000 | Nahi et al. | |
| 6,161,134 A | 12/2000 | Wang et al. | |
| 6,163,598 A | 12/2000 | Moore | |
| 6,167,040 A * | 12/2000 | Haeggstrom | 370/352 |
| 6,175,860 B1 | 1/2001 | Gaucher | |
| 6,216,158 B1 | 4/2001 | Luo et al. | |
| 6,240,097 B1 | 5/2001 | Weslock et al. | |
| 6,266,539 B1 | 7/2001 | Pardo | |
| 6,301,609 B1 | 10/2001 | Aravamudan et al. | |
| 6,308,201 B1 | 10/2001 | Pivowar et al. | |
| 6,411,965 B2 | 6/2002 | Klug | |
| 6,414,962 B1 * | 7/2002 | Hall et al. | 370/401 |
| 2001/0032189 A1 | 10/2001 | Powell | 705/59 |
| 2001/0034695 A1 | 10/2001 | Wilkinson | 705/37 |
| 2002/0002523 A1 | 1/2002 | Kossovsky et al. | 705/36 |
| 2002/0004775 A1 | 1/2002 | Kossovsky et al. | 705/37 |
| 2002/0046187 A1 | 4/2002 | Vargas et al. | 705/67 |
| 2002/0095311 A1 | 7/2002 | Donahue | 705/1 |
| 2002/0095368 A1 | 7/2002 | Tran | 705/37 |
| 2002/0129056 A1 | 9/2002 | Conant et al. | 707/511 |
| 2002/0138764 A1 | 9/2002 | Jacobs et al. | 713/201 |
| 2002/0165726 A1 | 11/2002 | Grundfest | 705/1 |

OTHER PUBLICATIONS

Terry, Douglas B. et al. *Managing Stored Voice In the Etherphone System*, Xerox Palo Alto Research Center vol. 1, (Feb. 1998), pps. 3–27, XP 000032477.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

International Search Report for PCT Application Serial No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–BrainPad*, Proceedings 13th Tron Project International Symposium, Online!, (Dec. 4–7, 1996), pps. 95–103.

Gessler, Stefan et al., *PDAs as Mobile WWW Browsers*, Computer Networks and ISDN Systems, vol. 28, No. 1, (Dec. 1995), pps. 53–59.

International Search Report for PCT Application Serial No. PCT/US00/26650, Dated Feb. 19, 2001.

International Search Report for PCT Application Serial No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Serial No. PCT/US00/26649, Dated Feb, 6, 2001.

* cited by examiner

SYSTEM AND METHOD FOR ASSOCIATING NOTES WITH A PORTABLE INFORMATION DEVICE ON A NETWORK TELEPHONY CALL

BACKGROUND OF THE INVENTION

A. Field of the Invention

The present invention relates to a method and system for providing communication services over a network. In particular, the present invention relates to a system and method for associating notes with a portable information device on a network telephony call.

B. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or deactivate a CLASS feature using "*" directives (e.g., *69 to automatically return a call to to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Data network telephones and the data network (e.g. Internet) system in which they operate, however, lack a substantial infrastructure and service providers for providing telephone service.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables a user to associate notes taken during a call with the call, using a Portable Information Device (PID). The associated notes would address problems related to organizing and categorizing notes. The system addresses problems related to the use of clumsy notetaking setups, such as taking notes on paper and filing the papers according to a filing system. Other disadvantages with prior note recording and organization systems are also addressed by embodiments of the present invention.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

The following references to patent applications filed concurrently herewith are incorporated be reference:
"System and Method for Controlling Telephone Service Using a Wireless Personal Information Device" to Schuster, et al.
"System and Method for Advertising Using Data Network Telephone Connections" to Schuster, et al.
"System and Method for Providing User-Configured Telephone Service in a Data Network Telephony System" to Sidhu, et al.
"System and Method for Accessing a Network Server Using a Portable Information Device Through a Network Based Telecommunication System" to Schuster, et al.
"System and Method for Interconnecting Portable Information Devices Through a Network Based Telecommunication System" to Schuster, et al.
"System and Method for Enabling Encryption/ Authentication on a Telephony Network" to Schuster, et al.
"System and Method for Using a Portable Information Device to Establish a Conference Call on a Telephony Network" to Schuster, et al.
"System and Method for Providing Shared Workspace Services Over a Telephony Network" to Schuster, et al.
"System and Method for Providing Service Provider Configurations for Telephones in a Data Network Telephony System" to Schuster, et al. The following additional references are also incorporated by reference herein:
"Multiple ISP Support for Data Over Cable Networks" to Ali Akgun, et al.
"Method and System for Provisioning Network Addresses in a Data-Over-Cable System" to Ali Akgun, et al., Ser. No. 09/218,793.
"Network Access Methods, Including Direct Wireless to Internet Access" to Yingchun Xu, et al., Ser. No. 08/887, 313

A. PID-Enabled Data Network Telephony System

Figure 1:
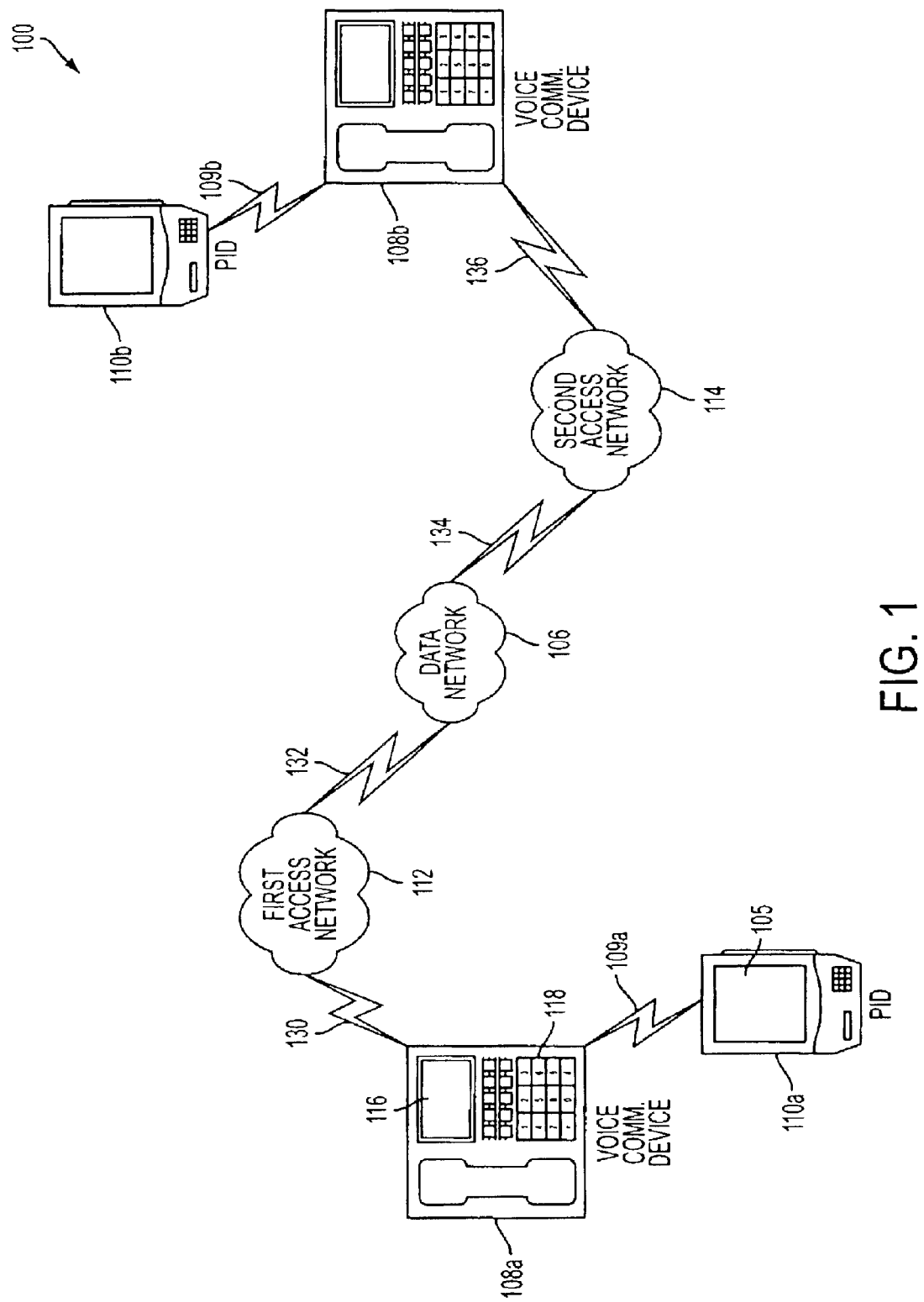
FIG. 1 is block diagram of a network telephony system according to one embodiment of the present invention.

FIG. 1 is a block diagram showing an exemplary embodiment of a system 100 for providing shared workspace services according to the present invention. The system includes a data network 106. A first voice communication device 108a linked to a first access network 112 via connection 130 may communicate over the data network 106 by connecting via the first access network 112. A second voice communication device 108b is linked to a second access network 114 through connection 136 and may communicate over the data network 106 by connecting via the second access network 114

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice-Over-Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The voice communication devices 108a–b (described further below with reference to FIG. 3) typically include a voice input, a voice output, and a voice processing system. The voice processing system converts voice sound to digital data signals that are communicated on a voice connection over the data network. The voice processing system also converts digital data signals received from the voice connection to voice sound. The voice communication devices 108a–b typically include a central processing unit and memory to store and process computer programs. Additionally, each voice communication device 108a–b typically includes a unique network address, such as an IP address, in memory to uniquely identify it to the data network 106 and to permit data packets to be routed to the device.

A first PID 110a linked to the first voice communication device 108a via link 109a may communicate over the data network 106 by connecting via the first access network 112. A second PID 110b linked to the second voice communication device 108b via link 109b may communicate over the data network 106 by connecting via the second access network 114. The PIDs 110a–b each may store user attributes in a user information database. The user attributes may contain such information as a user identifier (such as a SIP URL or other telephony locator), schedule information, and other information that is associated with a user of the PID 110a or 110b. The PIDS 110a–b each include a user interface allowing a user to easily enter and retrieve data. In a preferred embodiment, the user interface includes a pressure-sensitive display that allows a user to enter input with a stylus or other device. An example of a PID with such an interface is a PDA (Personal Digital Assistant), such as one of the PaIM™ series of PDAs offered by 3Com® Corporation. The PIDs 110a–b may also include other functionality, such as wireless phone or two-way radio functionality.

Links 109a–b are point-to-point links, and may entirely or partially wireless, or they may be hard-wired connections. Each of the links 109a–b is preferably a wireless link, such as an infrared link specified by the Infrared Data Association (IrDA) (see irda.org for further information) or a radio frequency (RF) link such as the Bluetooth system (see www.bluetooth.com for further information). However, the point-to-point link can also be a hardwired connection, such as an RS-232 serial port.

In one embodiment, the voice communication device 108a includes a handset with a receiver and transmitter similar or identical to handsets of traditional circuit-switched telephones. A console on which the handset sits may include the voice processing system, a display 116, and a keypad 118.

In a preferred embodiment, a portion of the voice communication device 108a utilizes an NBX 100™ communication system phone offered by 3Com® Corporation. In alternative embodiments, the voice communication device 108a may include any device having voice communications capabilities. For example, a personal computer having a microphone input and speaker output may also be used to implement the voice communication device 108a. Other configurations are also intended to be within the scope of the present invention.

The details relating to operation of the voice communication devices 108a and 108b depend on the nature of the data network 106 and the nature of the access networks 112 and 114 connecting the voice communication devices 108a and 108b to each other and/or to other network entities. The access networks 112 and 114 typically include any high bandwidth network adapted for data communications, i.e. a network having greater than 64,000 bits-per-second (bps) bandwidth. The access networks 112 and 114 may link to the voice communication devices 108a–b using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112 and 114 may also include the PSTN and link the voice communications devices 108a–b by an analog modem. Further details regarding specific implementations are described below, with reference to FIGS. 2 through 10.

B. System for Associating Notes with a Network Telephony Call Initiated by a Portable Information Device One advantage of the PID-Enabled Data Network Telephony System 100 in FIG. 1 is that it may be used to enable a user to take notes with a PID while participating in a voice conversation with a second user on a call that was initiated by the PID. In one embodiment, a user of the first PID, 110a is able to select a communications partner, such a by selecting the communications partner in an address book stored in the first PID 110a. The first PID 110a can then be caused to transmit information about the communication partner to the first voice communication device 108a across the first link 109a, enabling the first voice communication device 108a to attempt to complete a network telephony call to the communication partner, which may, for example, be located at the second voice communication device 108b. Upon detecting the incoming call at the second voice communication device 108b, the called communication partner can receive call information, such as the parties involved, the time of day, etc., by causing the call information to be transmitted from the second voice communication device to the communication partner's PID, which may, for example be the second PID 110b. In one exemplary embodiment, the called communication partner can point the second PID 110b to the second voice communication device 108b and cause the second PID 110b to transmit a request for the call information via the second link 109b. The second voice communication device 108b will then transmit the call information to the second PID 110b via the second link 109b, so that the call information can be stored in the second PID 110b. The caller and the called communication partner may proceed with a voice conversation while they each take notes on their respective PIDs 110a and 110b. The notes taken during the voice conversation are associated with the call information. As such the caller and the called communication partner may later access the notes taken on the PIDs by searching by the name of the caller or called party, the date or time, or the subject matter contained in the notes, for example.

The notes associated with the call may also be synchronized with a PC or other device, to allow the user to access the notes on the PC or other device. For example, a personal information manager application on a user's PC may contain contact information, schedule information, email services, task lists, and other organizing functionality. The notes associated with the call may be manually or automatically indexed for inclusion within the personal information manager, allowing the user to easily access the notes later. Automatic indexing might be performed by the note-taking application on the PID or on the personal information manager application in the PC, for example. Indexing categories could include the contact information of the parties to the call, date and time information based on the date and time information for the call, or the date and time information of an event referenced in the call notes, for example.

1. Local Area Network as an Exemplary Access Network

Figure 2:
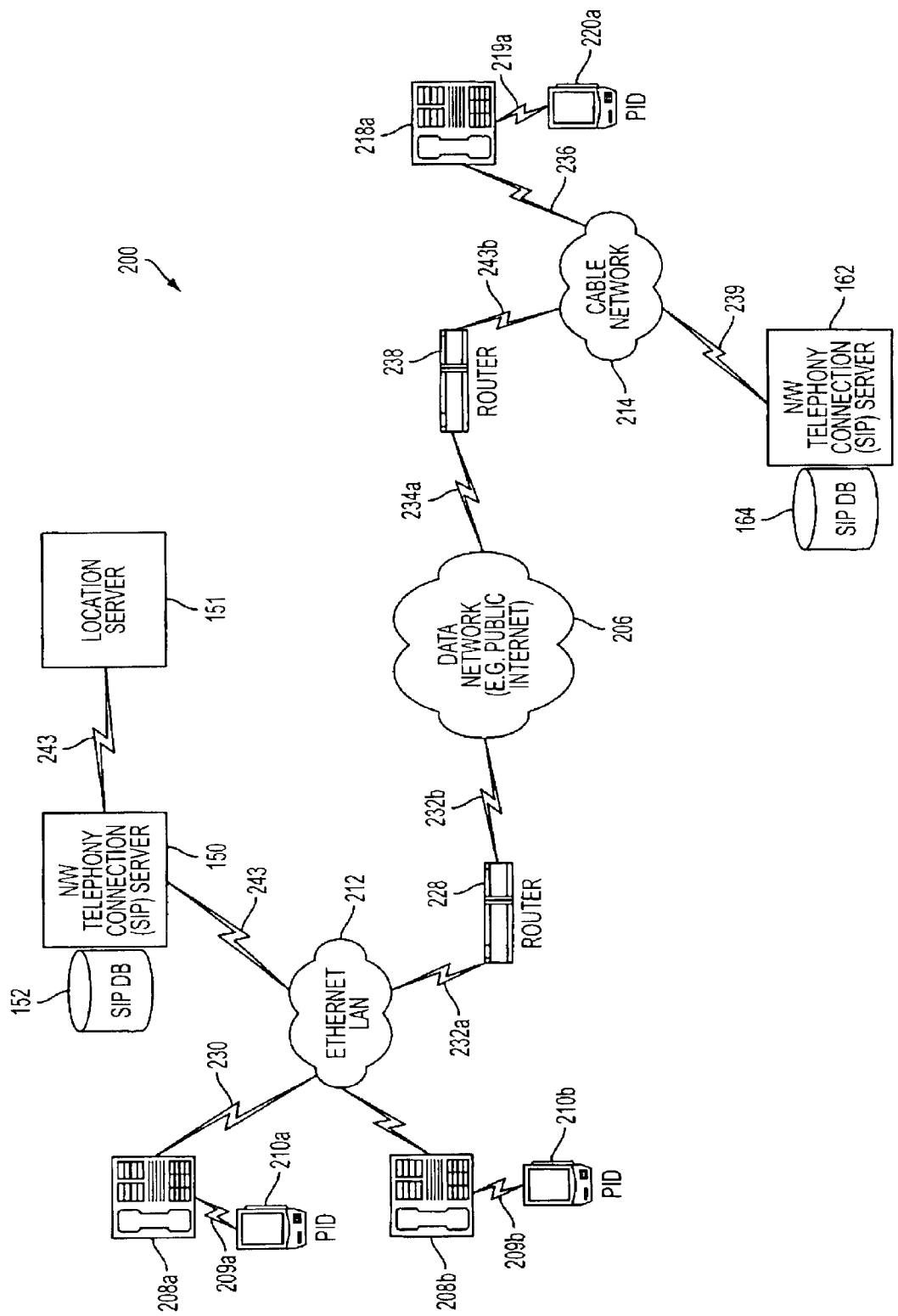
FIG. 2 is a block diagram showing a system for associating notes on a telephony system according to an exemplary embodiment of the present invention.

FIG. 2 is a block diagram showing one example of a system, such as the system 100 of FIG. 1 for providing shared workspace services according to the present invention. The system 200 in FIG. 2 includes a local area network 212, connected to a data network 206 by a first router 228. A cable network 214 is connected to the data network 206 by a second router 238. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

The local area network 212 provides data connectivity to its network elements, such as a first data network telephone 208a, a second data network telephone 208b, and a first network telephony connection server 150. The local area network 212 in FIG. 2 is an Ethernet LAN operating according to the IEEE 802.3 specification, which is incorporated by reference herein; however, any other type of local area network may be used. The local area network 212 uses the router 228 to provide the first data network telephone 208a, the second data network telephone 208b, and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 may register users by storing user records in a first registration database 152 in response to registration requests made by the user. Alternatively, registration information may be stored and maintained by a separate location server that may be accessed by the first network telephony connection server 150.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed using a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein. However, any other such protocol may be used. Other protocols include H.323, the Media Gateway Control Protocol (MGCP), MEGACO, etc.

The first network telephony connection server 150 may be used to provide telephony service for mobile users. A user may be registered to use the first network telephone 208a (which is identified by its telephone identifier, such as a hardware device or a network device), but the user may move to a location near the second network telephone 208b. The user may re-register as the user of the second telephone 208b. Calls that identify the user by the user's user identifier may reach the user at the second network telephone 208b.

The system 200 in FIG. 2 also shows a cable network 214 connected to the data network 206 by a router 238. The cable network 214 provides data network access to its network elements, which in FIG. 2 include a third data network telephone 218a and a second network telephony connection server 162. The users of the data network telephone 218a connected to the cable network 214 may communicate over the data network 206 with the users of the data network telephones 208a–b connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance, and tear down for data network telephones, such as the data network telephone 218a connected to the cable network 214. The second network telephony connection server 162 may be similar or identical to the first network telephony connection server 150 connected to the local area network 212.

The system 200 shown in FIG. 2 permits the data network telephones 208a–b connected to the local area network 212 to communicate with the data network telephone 218a connected to the cable network 214. The system shown in FIG. 2 uses SIP in order to establish, maintain, and tear down telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212. Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It also allows all mobile clients to register with their current locations.

Similarly, the second network telephony server 162 is the primary destination of all SIP messages trying to establish a connection with the data network telephone 218*a* connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 208*a–b* and 218*a* in the system 200 preferably have pre-programmed device identifiers (e.g. phone numbers), represented as SIP-URL's that are of the form sip: user@domain. Examples are sip: 8475551212@3Com.com or sip: johndoe@3Com.com. After power-up, each of the data network telephones 208*a–b* and 218*a* sends a SIP REGISTER message to a default registrar, such as one of the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephones 208*a–b* or 218*a* are running the DHCP (Dynamic Host Configuration Protocol) so that when the location is changed, the IP address is also automatically changed.

An advantage of the system in FIG. 2 is that once a call is established between data network telephones, the data network 206 provides data connectivity for one or more data communications channels. For example, the data network telephones 208*a*, 208*b*, and 218*a* can communicate voice signals to one another as voice-over-data packets on voice-over-data channels. The data network telephones 208*a*, 208*b*, and 218*a* can also communicate user data, such as graphical data as graphical data packets on graphical data channels. For example, the graphical data may be communicated to and from first and second PIDs 210*a* and 220*a* across links 209*a* and 219*a* to the data network telephones 208*a* and 218*a*, where the graphical data is assembled into packets for transmission and disassembled from the packets upon receipt, as part of the process for communicating the graphical data packets across the data network 206 and any access networks, such as the Ethernet LAN 212 and the cable network 214. Other data channels besides voice-over-data channels and graphical data channels may also be provided and used for data transport.

4. The Data Network Telephones

The data network telephones 208*a–b* are preferably telephones that each include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server, which is not shown in FIG. 2.

Figure 3:
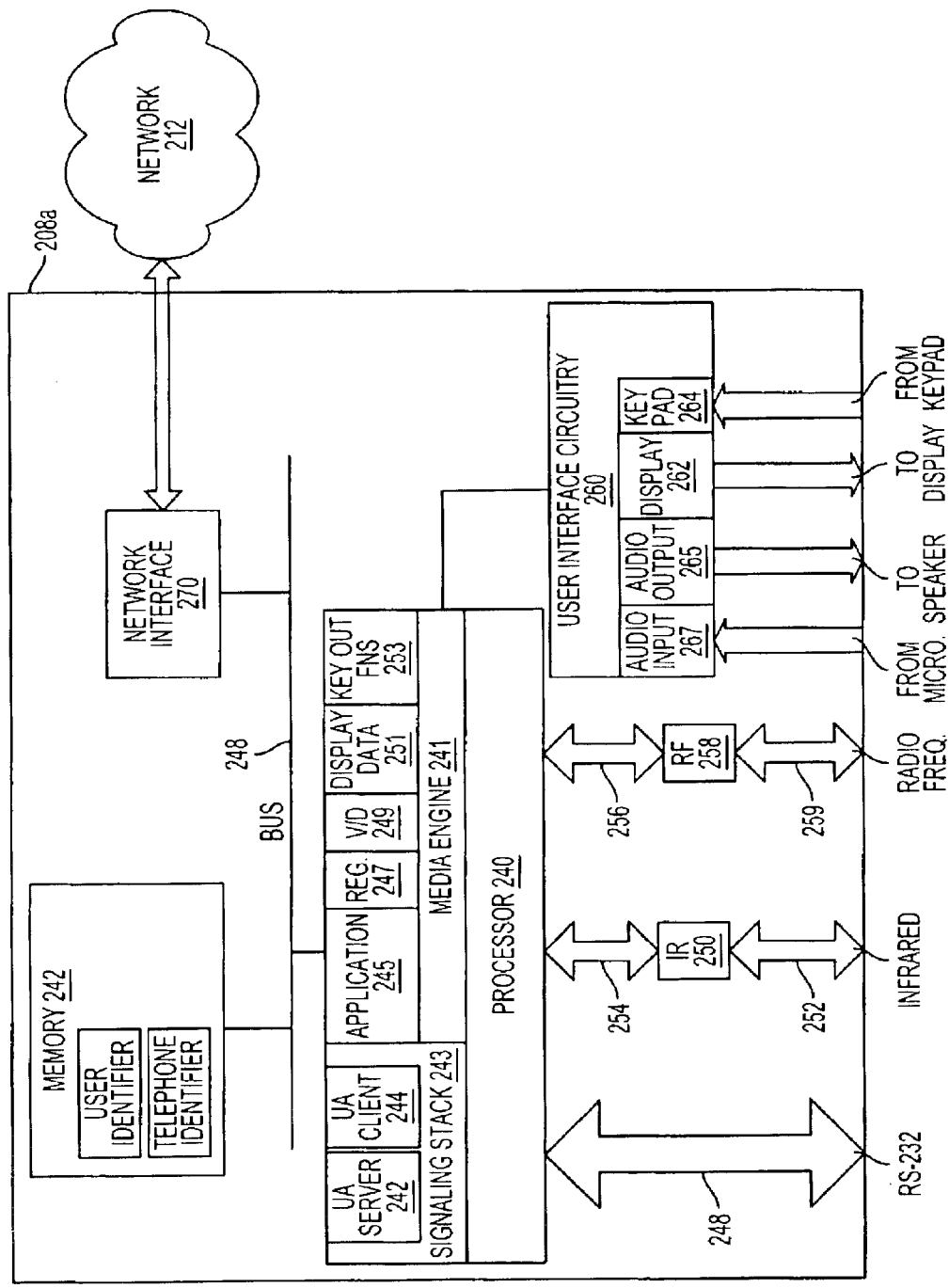
FIG. 3 is a block diagram of a data network telephone according to an exemplary embodiment of the present invention.

FIG. 3 is a block diagram showing the data network telephone 208*a* connected to the local area network 212 in FIG. 2. The data network telephone 208*a* in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative link interfaces to a PID, such as the PID 210*a*.

A first link interface 248 includes an RS-232 serial connection and associated coupling hardware and mechanisms. The first alternative link interface 248 may, for example, be a docking cradle for a PDA (Personal Digital Assistant), in which information can be transferred between the PDA and the data network telephone 208*a*. The second alternative link interface comprises a first connection 254, such as an RS-232 connection, along with infrared circuitry 250 for converting signals into infrared output and for accepting infrared input. An infrared interface 252 may also be included within the second alternative link interface. The third alternative link interface comprises a first connection 256, such as an RS-232 connection, along with radio-frequency circuitry 258 for converting signals into radio frequency output and for accepting radio frequency input. A radio frequency interface 259 may also be included as part of the third alternative link interface.

The three alternative link interfaces described above are merely examples, and additional means for implementing the link interface between the data network telephone 208a and the PID 210a may also be used. Although three link interfaces are shown in FIG. 3, there may be only one such interface in the data network telephone 208a. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry includes a display interface 262, a keypad interface 264, an audio output interface 265, and an audio input interface 267.

The audio input interface 267 may receive voice signals from a microphone or other audio input device and convert the signals to digital voice information. The conversion preferably conforms to the G.711 ITU Standard. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through a magnetic speaker. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display interface 262, are optional and serve to enhance the functionality of the first data network telephone 208a.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software to implement the functions of the data network telephone 208a. The operating system may be any suitable commercially available embedded or disk-based operating system, or any proprietary operating system.

The processor 240 includes a media engine 241 and a signaling stack 243 to perform the primary communications and application functions of the data network telephone 208a. The purpose of the signaling stack in the exemplary data network telephone 208a is to set up, manage, and tear down a call. During the setup phase, a user may use the keypad to enter a user-identifier to call. Alternatively, a PID such as PID 210a may transmit the user identifier of the party across the first link 209a. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208a in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the data network telephones 208a may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter. Similar procedures may be performed for other types of data, such as graphical data.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 208a with a network telephony service are processed by the registration function 247. By registering the data network telephone 208a, a user may establish with the network telephony connection server 150 that calls addressed to the user's user identifier may be connected to the data network telephone 208a. Registration may occur when the data network telephone 208a sends a request to register to a service provider host, such as the network telephony connection server 150. The service provider host may respond by setting the user's user identifier to correspond to the telephone identifier of the data network telephone 208a, and by acknowledging the request with a status message to the data network telephone 208a. In one embodiment, a request to register the data network telephone 208a to a default user is automatically sent during power-up of the data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The selected protocol is preferably a protocol that is supported by data network telephones that will receive the data being transported.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The data network telephones 208b and 218a are preferably similar or identical to the data network telephone 208a. For each of the data network telephones 208a–b and 218a, many of the features described in FIG. 3 are optional and their inclusion depends on the services to be offered.

5. The Portable Information Devices (PIDs)

Figure 4:
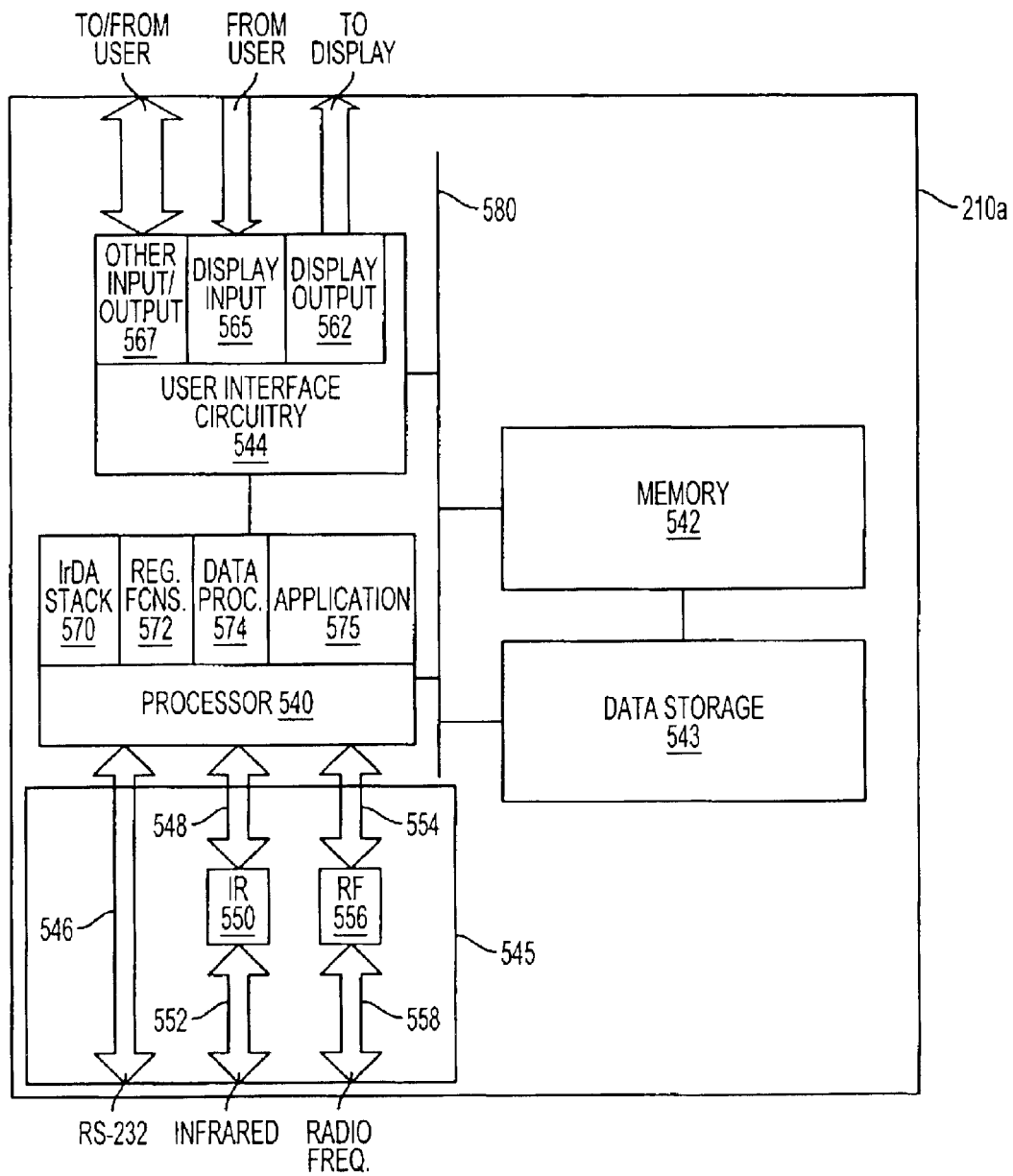
FIG. 4 is a block diagram of a portable information device (PID) according to an exemplary embodiment of the present invention.

FIG. 4 is a block diagram showing the exemplary PID 210a that can communicate via the link 209a with the data network telephone 208a connected to the LAN 212. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first link interface 546 includes an RS-232 serial connection and associated coupling hardware mechanisms. The first alternative link interface 546 may, for example, be for coupling with a PDA docking cradle, in which information can be transferred between the PDA and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specifications, described at www.bluetooth.com.

The three alternative link interfaces described above are merely exemplary, and additional means for implementing the interface between the PID 210a and the data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data-inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or additional input, such as video camera input for example, may be entered through the additional input/output interface 567. Touch-sensitive screen buttons are an exemplary method for a user to enter control data into the PID 210a.

The processor 540 may include an operating system, as well as application and communication software, to implement the functions of the PID 210a. The operating system may be any suitable commercially available operating system, or any proprietary operating system. The operating system and software may be stored on data storage 543, in the memory 542, or the may be embedded in the processor 540. Although the processor 540 is shown connected to the data storage 543 through a bus 580, other configurations may also be used. Similarly, the memory 542 may be configured other than as shown in FIG. 4, and may be embedded within the processor 540.

The PID 210a may be able to send and receive data from the data network telephone 208a across a point-to-point link, such as the point-to-point link 209a shown in FIG. 1. For example, a user may enter graphical data at the display input 565. The graphical data may be processed in the user interface circuitry 544 or it may go directly to the processor 540 or the memory 542. The processor 540 may also perform processing functions, such as compression. A graphical data.application may be used to implement the display input, the display output, and the processing functions. For example, a drawing application may be used to accept graphical data input, the display input 565 from a user drawing with a stylus on the display screen of a PDA. A drawing application could then display the drawing through the display output 562 to enable the user to see a visual representation of the drawing. If the user desires to share the drawing with a second user on the system 200, where the second user is using a different PID such as a third PID 220a, the graphical data from the drawing application can be transmitted through one of the point-to-point interfaces 545, allowing the data to be received by the first data network telephone 208a through the link 209a. An application in the first data network telephone 208a receives the graphical data, which may then be prepared for transmission across the data network 206, such as by the media engine 241 shown in FIG. 3. Preferably the graphical data is converted to graphical data packets and is communicated on a graphical data channel across the LAN 212 through the router 228 across the data network 206 through the second router 238 across the cable network 214 to the third data network telephone 218a. The third data network telephone 218a may then convert the graphical data packets received on the graphical data channel back into graphical data. The graphical data can then be transmitted across the third point-to-point link 219a to the third PID 220a, where it may be displayed on a display screen on the PID 220a to be viewed by the user of the third PID 220a. The third PID 220a may contain a similar drawing program as that which was referenced to the PID 210a, allowing the user of the PID 220a to modify the drawing and transmit the modifications back across the point-to-point link to the third data network telephone 218a across the cable network 214 through the second router 238 across the data network 206 through the first router 228 across the LAN 212 to the first data network telephone 208a across the point-to-point link and back to the first PID 210a. This example demonstrates an alternative embodiment of the present invention, in which data received from a remote PID across a data network can be associated with a call at a near-end PID, in addition to the associated data that has been entered by the user of the near-end PID.

The point-to-point link 209a may be a serial bit stream between an application in the first PID 210a and an application in the first data network telephone 208a. For example, the link 209a could be an infrared link that is implemented with minimal stack interpretation. However, the link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
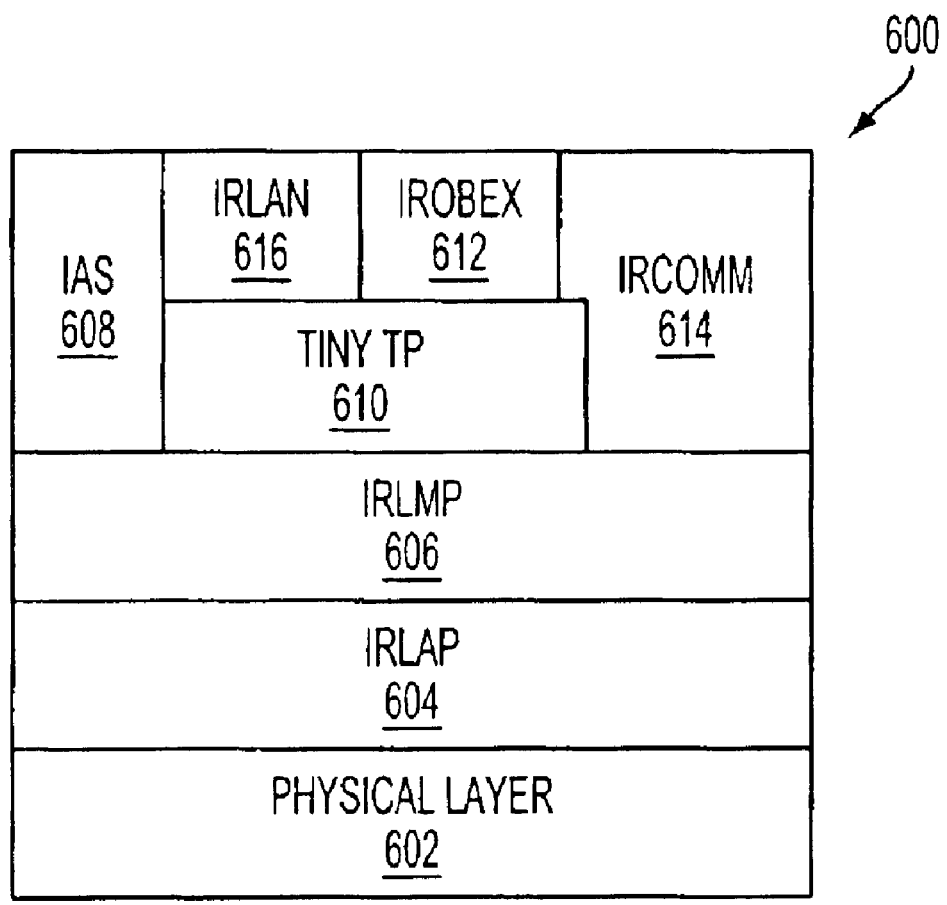
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

In one embodiment, the data network telephones 208a and 218a merely provide a data tunnel for the data channel attendant to the infrared links, while the IrDA protocol stack is implemented at the endpoint PID devices 210a and 220a. Alternatively, IrDA stacks may be implemented in the data network telephones as well. By implementing additional layers of the IrDA protocol stack, the PID applications and the base applications in the data network telephones can be simplified because the IrDA protocol layers take over certain functions. For example, the IrDA protocol stack can be implemented at each PID 210a and 220a, and the IrOBEX layer 612 can be used to transfer text and graphics object files, such as drawings or electronic business cards, end-to-end between PID devices connected via data network telephones and networks. Embodiments of the present invention are not required to provide IrDA protocol support, however, certain advantages may be realized by implementing IrDA or other similar protocols.

6. Providing Telephony and Shared Workspace Services

Figure 6:
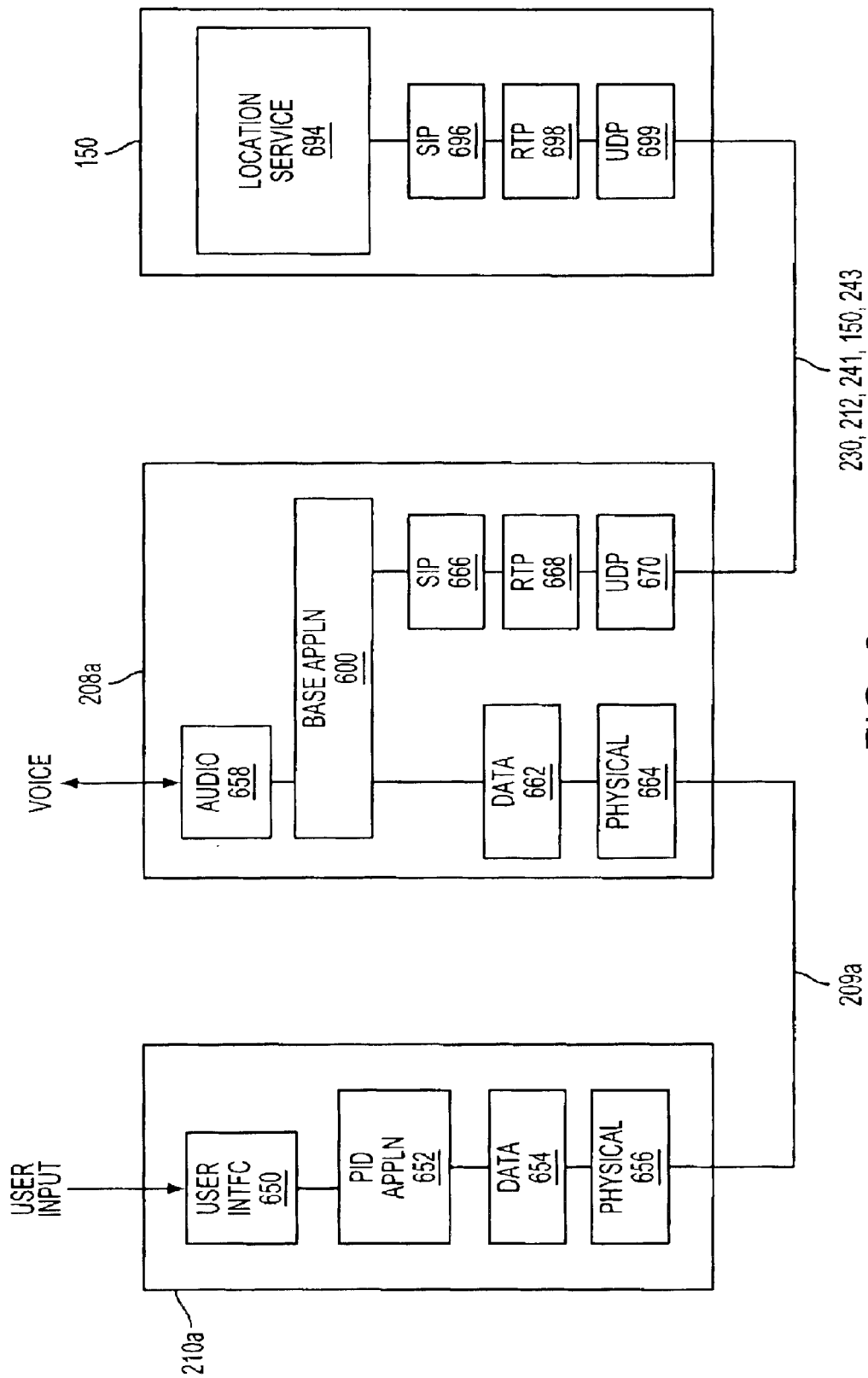
FIG. 6 is a block and stack layer diagram illustrating an embodiment of the protocol stacks in an exemplary embodiment of a PID linked to a data network telephone.

FIG. 6 is a functional block diagram and protocol stack diagram illustrating an embodiment of the protocol stacks in the first PID 210a and the first data network telephone 208a that support link 209a. In the infrared RS-232 embodiment, the link interface circuitry 545 in the PID 210a provides the physical layer 656, such as that specified by the Infrared Data Association (IrDA), that connects via link 209a to the link interface circuitry 260 implementing a physical layer 664 in the first data network telephone 208a. The data link layer 654 in the first PID 210a provides data link control for link 209a in transferring data to and from a PID application client 652. Similarly, the first data network telephone 208a includes a data link layer 662 and a base application server 600 that is configured to synchronize connection and other functions with the PID application 652 in the first PID 210a.

When PID 210a is activated, either through power-up or through a user input at the user interface 650, the synchronization application client 652 in the PID 210a may send the user's SIP URL across the link 209a to the first data network telephone 208a, where it is received by the synchronization application server 600. The synchronization application server 600 sends the SIP URL received from the PID 210a across connection 230 and the Ethernet LAN 212 through connection 243 to the network telephony connection server 150. The network telephony-connection server 150 may store the SIP URL and the IP address of the associated data network telephone 208a in the SIP database 152 so that the SIP URL is listed as being resident at the IP address of the data network telephone 208a. (If the network telephony connection server 150 uses a location server for registration/location tasks, the registration information might instead be stored with such a location server). SQL (Structured Query Language) is preferred for implementing and maintaining the database. Once the PID 210a is registered with the network telephony connection server 150, calls to the SIP URL for PID 210a (or the user of the PID 210a) will be directed to the data network telephone 208a.

Figure 7:
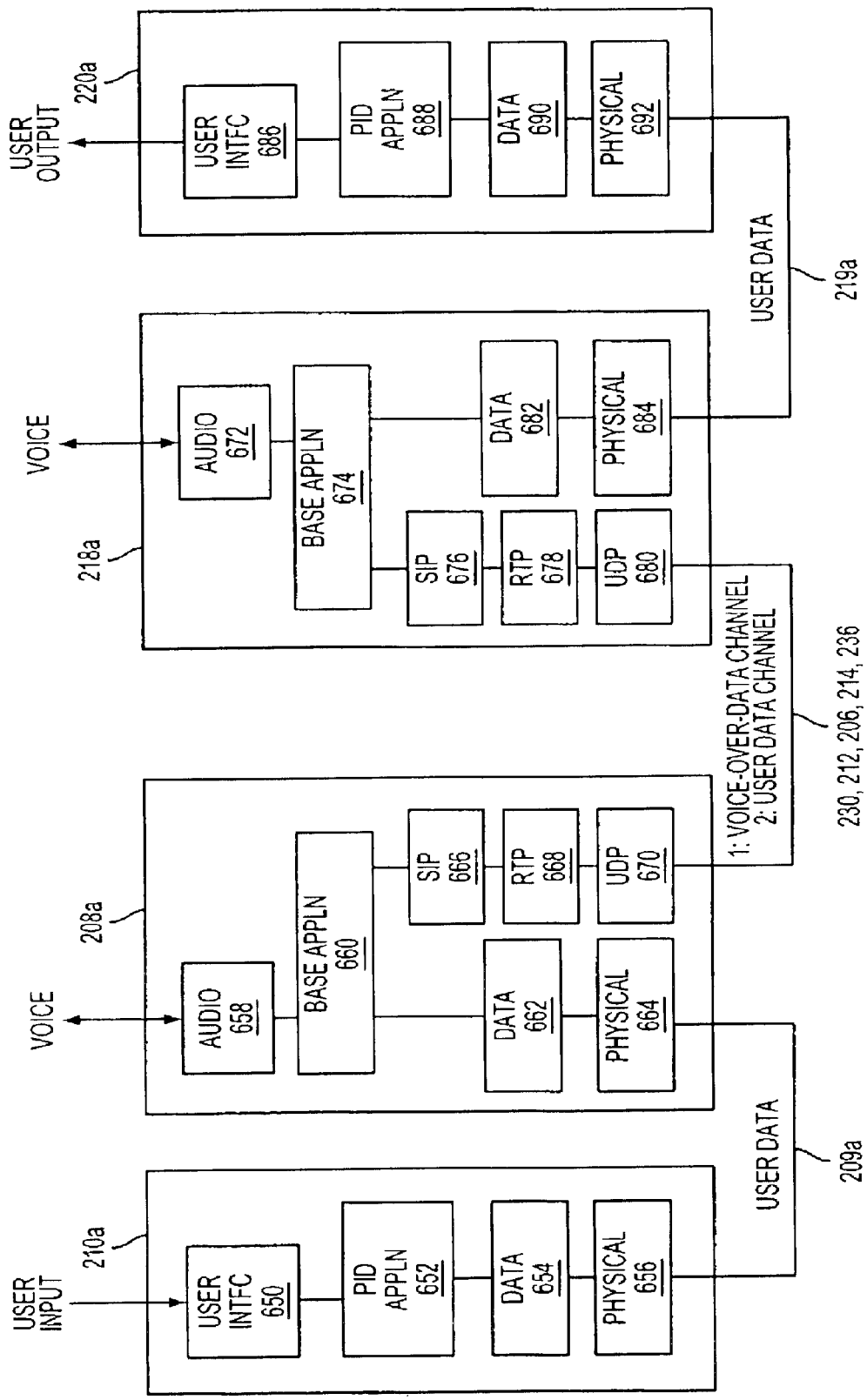
FIG. 7 is block and stack layer diagram illustrating an embodiment of the present invention in which a SIP call may be established.

FIG. 7 is a functional block and protocol stack diagram illustrating an embodiment of the present invention where a SIP connection is established from the first data network phone 208a to the third data network phone 218a through network connection 230, first access network 212, data network 206, second access network 214 and network connection 236. The routers 228 and 238, and associated connections 232a–b and 234a–b, are not shown to simplify the block diagram representation.

The diagram of FIG. 7 shows how user data, such as graphical or audio data, can be passed from one PID to another PID in one aspect of the present invention. The PID application 652 in PID 210a is configured to send user data input through the user interface 650 through link 209a to base application 660 in the first data network phone 208a. In this embodiment, base application 660 is configured to define data channels for transport to the third data network telephone 218a.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

v=0
o=alice 2890844526 2890844526 IN IP4 host.anywhere.com
c=IN IP4 host.anywhere.com
m=audio 49170 RTP/AVP 0
a=rtpmap:0 PCMU/8000
m=video 51372 RTP/AVP 31
a=rtpmap:31 H261/90000
TABLE 1.

If the called device includes functionality to receive the connection as described in Table 1, then the called device will respond to the INVITE request with a "200 OK" response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data and a second data channel for user data have been negotiated by the base applications 660 in the first data network telephone 208a and the base application 674 in the third data network telephone 218a. The base applications 660 and 674 transfer voice data between the AUDIO applications, such as applications including G.711 encoders, in each data network telephone 208a and 218a via the first data channel. The base application 660 in the first data network telephone 208a is also configured to send the user data received via link 209a from the first PID 210a to the base application 674 in phone 218a via the second data channel. The base application in the third data network telephone 218a is configured to forward the user data received via the second data channel to the third PID 220a via link 219a. The PID application 688 in the third PID 220a then outputs the user data to the user.interface 686 for output to the user of the third PID 220a.

The user data in FIG. 7 can take a variety of forms. For example, the user data can be graphical data such as a text file containing information about the user of the first PID 210a (e.g. an electronic business card). The user data could also be graphical data in the form of drawing data generated by graphical applications in the first PID 210a, where a user drawing on a touchscreen of the user interface 650 in PID 210a generates corresponding graphical data that is transmitted via the user data channel to the third PID 220a for display on the user interface 686 of the third PID 220a. The media description for the user data in the user data channel can be defined during connection setup to establish a connection appropriate to the type of data being transferred. These examples represent just a few of the applications for this aspect of the present invention and should not be viewed as limiting the present invention.

In one embodiment, RTP data packets for two or more types of data are exchanged between the first data network telephone 208a and the second data network telephone 218a according to one of three possible methods. In the first method, one RTP data channel (or RTP stream) on UDP carries data packets in which both data types are present in a single split packets. Each such split packet contains (1) a source port number and a destination port number in the UDP portion, and (2) a special payload sequentially including each of the data-types in the RTP portion. The special payload type can be defined in the SDP described with reference to FIG. 6. Other information is also contained in each packet as well. In the second method for transmitting two or more data types, a separate RTP over UDP data channel is created for each of the different data types, and the RTP header indicates which type of data is contained in each packet. For example, voice data coded as G.711 might be assigned a payload type code of 0, while graphical data is assigned a payload type code of 190. In the third method for transmitting two or more data types, a single RTP/UDP data channel (RTPJUDP stream) is created that contains data packets of two or more different types. In this method, the data types are identified in a payload type field in the RTP header of each packet, enabling an underlying application to identify which data packets are voice data packets and which data packets are graphical data packets, for example.

Figure 8:
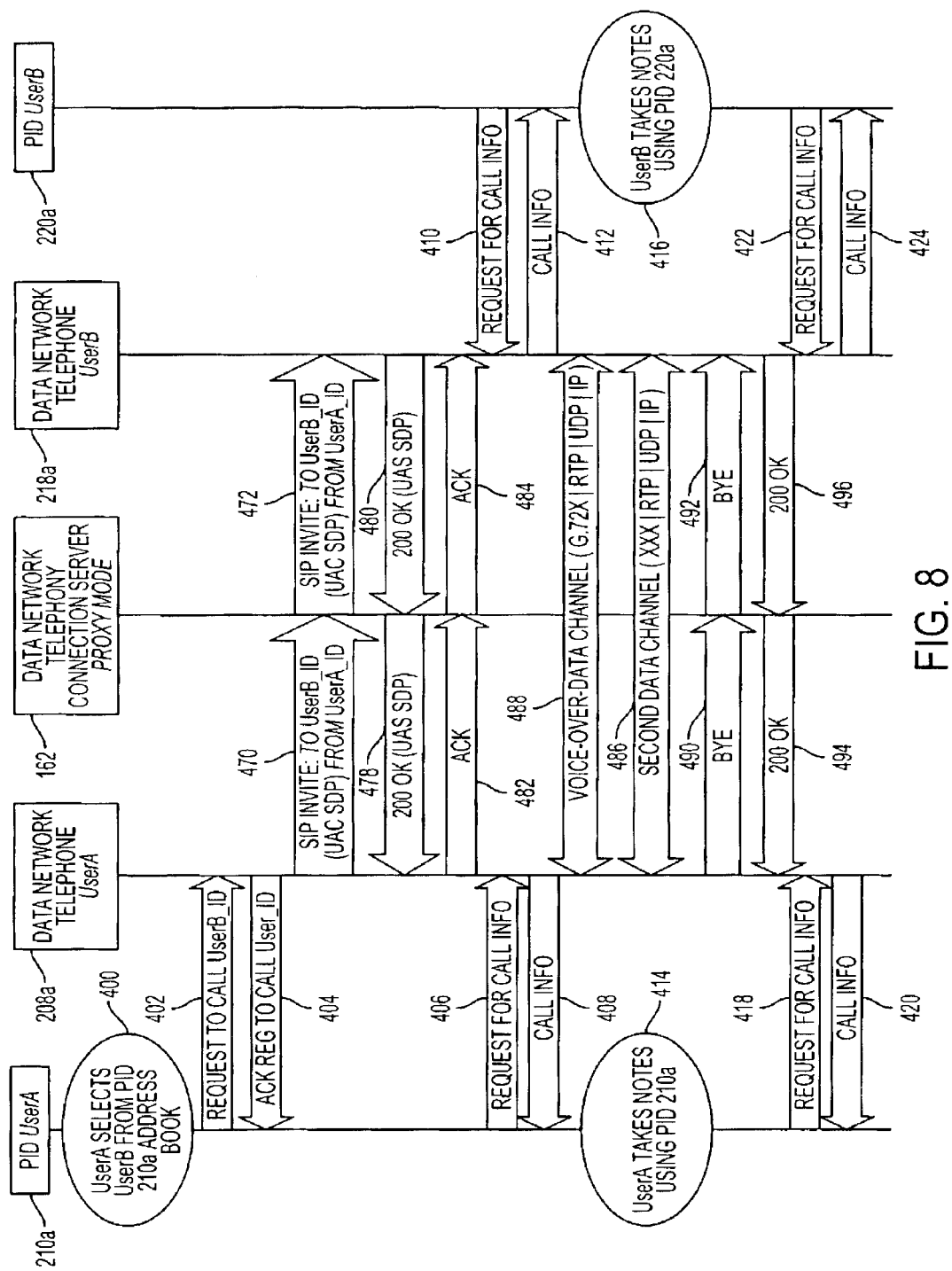
FIG. 8 is a message flow diagram illustrating exemplary message flow patterns that may occur in a note-taking session on a call initiated by a PID.

C. System for Associating Notes on a Network Telephony Call with a Portable Information Device FIG. 8 shows an example of the message flow patterns that may occur in a PID-initiated call in which PID notes are associated with the call. For the example shown in FIG. 8, SIP is illustrated as the call management protocol; however, other call management protocols may also be used.

UserA first selects UserB's name from an-address book application stored in UserA's PID 210a. Address book applications for PIDs are known by those having skill in the art. An example of such an address book application is a contacts list stored in a PDA (Personal Digital Assistant). The selected entry preferably includes contact information for UserB, including UserB's SIP URL, which is generically referred to in FIG. 8 as UserB_id. To initiate the call, the PID 210a transmits a request message 402 across the link 209a to the first data network telephone 208a to cause the first data network telephone 208a to attempt to place a call to UserB. The PID may create an electronic record of the call attempt if it is desired to document call attempts by UserA. In an alternative embodiment, UserA may instead initiate the call from the data network telephone 208a, in which case UserA begins the telephone call by dialing User B's user identifier using the keypad 118 on the data network telephone 208a.

The SIP Invite message 470 from UserA at the data network telephone 208a is the request to initiate a call to UserB. The data network telephone 208a sends the request to initiate the call to the data network telephony connection server 162 providing service to UserB. The request to initiate the call to UserB includes UserB's user identifier (such as UserB's SIP URL) as the callee identifier, UserA's user identifier (such as UserA's SIP URL) as the caller identifier, and the protocols supported by UserA's data network telephone 208 (UserA's User Agent Client SDP).

In its role as a proxy server, the telephony connection server 162 sends the SIP Invite message 472 to the data network telephone 218a identified in the SIP database 164 (or determined from a location server) as being associated with User B. The third data network telephone 218a responds with a response message 480 to the telephony connection server 162. The telephony connection server 162 receives the response message and sends the response message to UserA's data network telephone 208a as shown at 478.

User A's data network telephone 208a receives the response message and may prepare an acknowledgement message if called for by the protocol (e.g. the SIP protocol). If required, UserA's data network telephone 208a sends a SIP Acknowledgement message 482/484 to UserB's data network telephone 218a to complete the initiation of the telephone call.

To maintain a database of calls placed by UserA, the PID 210a sends a request 406 for information about the current call to UserB. As was described above, the calling PID 210a may create a record when the call attempt is first initiated (i.e., when the PID 210a first requests the first data network telephone 208a to attempt the call to the data network associated with UserB). Alternatively or additionally, the PID 210a may make a request 406 for information about the current call upon receiving the response message 478 from the data network telephone 218a associated with UserB. As another alternative, the request for 406 for call information could be made at any other time during the call, such as at a time when UserA determines that he or she would like to take notes on the PID 210a that are associated with the call in the form of a call record on the PID 210a. In response to the request 406 for call information from the PID 210a, the first data network telephone 208a transmits the requested call information 408 to the PID. The call information 408 may include details such as the data and time when the call was first attempted, the data and time when the call attempt was accepted, the data and time when the call attempt was completed by the transmission of the ACK message 482/484, the name and/or other contact information of the called party, the call parameters, or any other information relating to the call between the UserA and the UserB. The UserB can use his or her PID 220a to make a similar request 410 for call information to the data network telephone 218a. The data network telephone 218a transmits the requested call information 412 to the PID 220a.

The requests for call information 406 and 410 are preferably made by sending a request signal from the PIDs 210a and 220a to the data network telephones 208a and 218a. For example, UserA can point the first PID 210a toward the first data network telephone 208a to cause an infrared synchronization operation to occur across the link 209a. Other alternative linking schemes, as discussed with reference to FIGS. 3 and 4, may also be used. The PID application 652 and the base application 660 in the data network telephone 208a (as shown in FIG. 7) may be used to control, record, and exchange information about the current call. The PID application 652 also may maintain a database containing a record of calls which it associates with any notes taken by the UserA during the calls (or any information transferred, such as from UserB to UserA which UserA wishes to store in the PID 210a and associate with the call record). The PID application 652 may also implement the call association functionality using alternative approaches. In any case, it may be desirable for the PID application 652 to provide search capabilities to enable the UserA to search for notes by searching for the time or date of the call, the name of the communication partner or partners, or the subject matter of the call, for example. The PID 220a can create the call record in a similar manner as was described for the PID 210a.

UserA's data network telephone 208a preferably establishes a voice-over-data channel 488 with UserB's data network telephone 208b to permit voice communication between UserA and UserB. The voice-over-data channel 488 is preferably a data communications channel in which voice signals that have been converted to digital information are being carried as voice-over-data packets in accordance with a selected protocol, such as RTP over UDP/IP, as shown in FIG. 8. The voice-over-data packets include UserB's voice data in a first quantity of the voice-over-data packets, and contain UserA's voice data in a second quantity of the voice-over-data packets. UserB's voice-over-data packets and UserA's voice-over-data packets each include an IP protocol component, a UDP component, an RTP component and a G.72x component in the exemplary embodiment shown in FIG. 8.

A second data channel 486 is also shown in FIG. 8, which may be used to transmit graphical data, for example, for display on a data network telephone display screen 116, or on a PID display screen 105. For display on a PID screen, the graphical data is transmitted from a data network telephone, such as the first data network telephone 208a, to a PID, such as the first PID 210a. As such, the Users of PIDs 210a and 220a are able to utilize a shared workspace on their PIDs 210a and 220a while they participate in a conversation over the voice-over-data channel 488. In FIG. 8, the second data channel is shown as an RTP/UDP/IP channel. Other transport protocol implementations, such as TCP/IP, may also be utilized.

While UserA and UserB are participating in a voice conversation using the voice-over-data channel 488, UserA and/or UserB may desire to take notes based on the content of the conversation between UserA and UserB. UserA may take notes on the first PID 210a by using input means such as display input 565 or other input 567 as shown in FIG. 4. For example, UserA could use a stylus to jot down notes of the content of the conversation between UserA and UserB. Alternatively, if the PID 210a contains voice-recording functionality, UserA may desire to record segments of the conversation between UserA and UserB for later reference by accessing the call record for the current call. Similarly, other data may be associated with the current call, such as video data or graphical data received across the data network on a data channel such as the second data channel 486. To receive information carried in the second data channel, it may be necessary for the PID 210*a* to request the data network telephone 208*a* to transmit the requested information to the PID 210*a* over the link 209*a*. UserB takes notes 416 using the PID 220*a* in a similar manner as described above for UserA taking notes 414 using PID 210*a*.

The call is terminated when one of the parties signals the end of the call. In FIG. 8, UserA signals the end of the call by causing UserA's data network telephone 208*a* to send a BYE message 490/492 to UserB's data network telephone 218. UserB then sends a "200 OK" response message 494/496 to UserA.

It may be desired for information about the call termination to be recorded in the call record on the PIDs 210*a* and 220*a*. The PID 210*a* makes a request 418 for information about the call. The data network telephone 208*a* provides the requested information 420 to the PID 210*a*. Similarly, the PID 220*a* can make a request 422 for information about the call to the data network telephone 218*a*. The data network telephone 218*a* can then transmit the requested call information 424 back to the PHD 220*a* so that the call record may be completed. Alternatively, the PID 210*a* can be used to initiate the BYE message 490, in which case the PID 210*a* is likely to have a record of the date and time when the call was terminated. As another alternative, UserA can enter the date and time of the call termination into the PID 210*a* manually. UserB can perform a similar operation on PID 220*a* upon termination of the call. (A similar manual operation could also be performed at the beginning of the call instead of synchronizing the PIDs with the data network telephones.)

Figure 9:
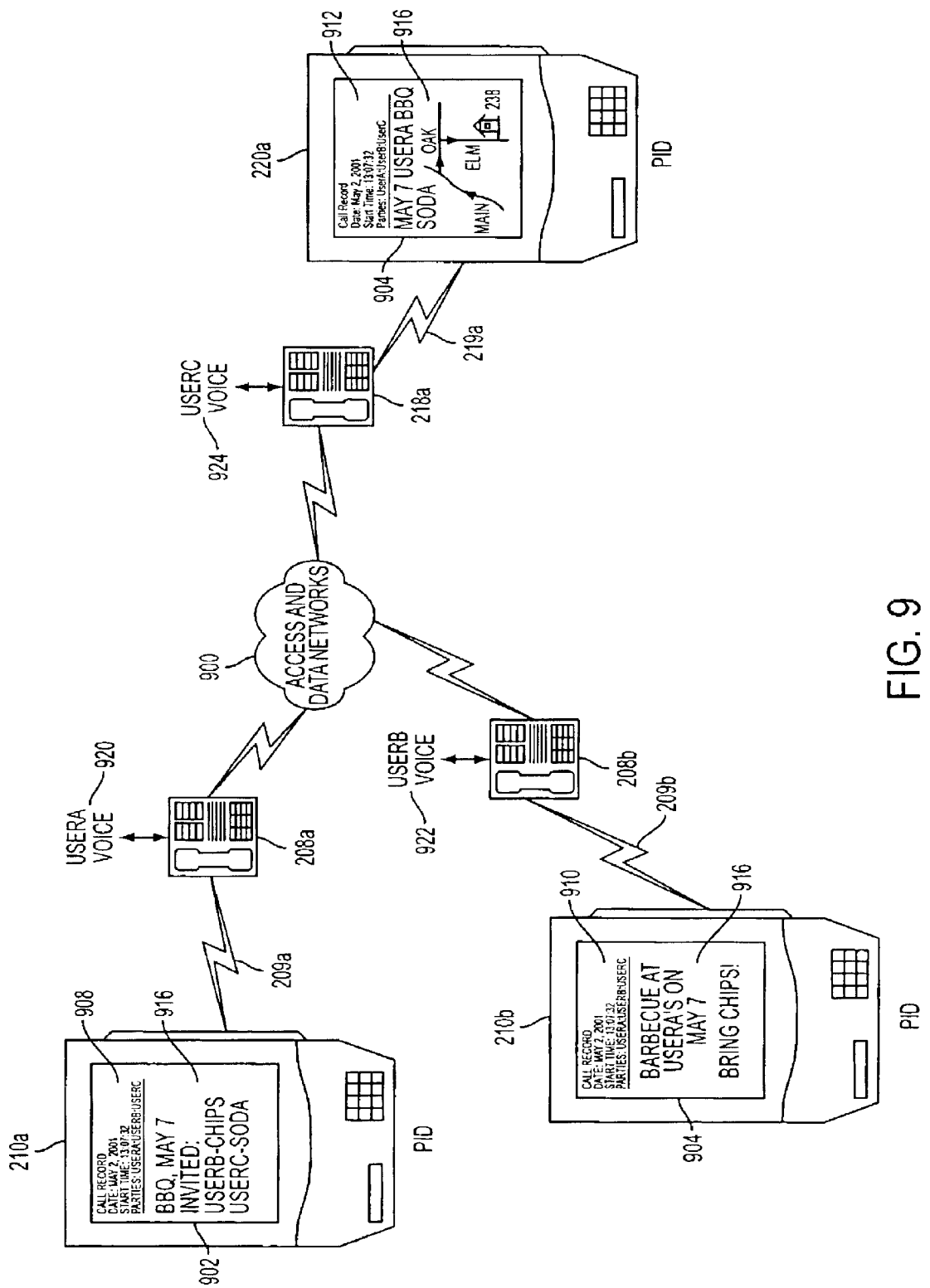
FIG. 9 is a block diagram illustrating an exemplary three-party call in which notes are associated with the call on PIDs.

The example shown in FIG. 8 illustrates a typical two-party call. In another embodiment of the present invention, more than two parties may participate in the call. For example, a three-party conference call between the UserA associated with the first PID 210*a* and the first data network telephone 208*a*, UserB associated with the third PID 220*a* and the third data network telephone 218*a*, and a UserC associated with the second PID 210*b* and the second data network telephone 208*b* may be set up. FIG. 9 shows a simplified representation of such a set-up. The access networks 212 and 214, the data network 206, the routers 228 and 238, and the telephony connection servers 150 and 164 have all been reduced to a single telephony network 900 to improve clarity. The set-up shown in FIG. 9 illustrates the operation of an exemplary embodiment of a system for associating notes with a network telephony call between three parties. In FIG. 9, it is assumed that the calls in progress, and voice-over-data channels are in place between the first voice communication device 208*a* and the second voice communication device 208*b*, between the second voice communication device 208*b* and the third voice communication device 218*a*, and between the first communication device 208*a* and the third voice communication device 218*a*. The call set-up process proceeds similarly for three or more parties as was described for the 2-party call in FIG. 8. FIG. 9 uses the example of UserA inviting UserB and UserC to a barbecue at UserA's house. The PIDs 210*a*, 210*b*, and 220*a*, include respective PID touch-sensitive displays 902, 904, and 906, in which a stylus or other input device can be used to enter graphical input information into the PIDs 210*a*, 210*b* and 220*a*. Other input mechanisms, such as a keypad, may also be used. Each of the displays 902, 904, and 906 show a call record containing a call information portion such as the call information portion 908 on display 902 in PID 210*a* associated with UserA. The displays 902, 904, and 906 also contain a notes portion in the call record, such as the notes portion 914 on display 902 in the PID 210*a* associated with UserA. PIDs 210*b* and 220*a* contain similar notes portions 916 and 918.

In the example of FIG. 9, UserA has recorded notes in the note portion 914 listing the barbecue and the date of the barbecue as well as the people invited (UserB and UserC). UserA has preferably entered this information using a stylus on the touch-sensitive display 902 of the PID 210*a*. UserB has taken notes on the notes portion 916 of the display 910 on PID 210*b*, referencing the date and location of the barbecue and what UserB is supposed to bring to the barbecue. UserB may also have used a stylus to enter the information in the notes portion 916. An exemplary alternative would be to use a keypad to enter the information in the notes portion 916. Other alternatives are also possible and intended to be within the scope of the present invention. UserC has taken notes in the note portion 918 of the display 906 of the PID 220*a* that list the date and location of the barbecue and show a map of how to get to UserA's house. UserC has also listed that he is to bring soda to the barbecue.

The information in notes portion 918 may be entered by UserC in a number of ways, as described above. Alternatively, some or all of the notes in the note portions 914, 916, and 918 may have been transmitted across a telephony network 900 from one party to another party in the call. For example, the map in display 918 may have been drawn by UserA, using a drawing application and a stylus on the PID 210*a*. The map could then be transmitted across the link 209*a* to the first data network telephone 208*a* where the graphical data could be assembled into graphical data packets for transport in a graphical data channel between the first data network telephone 208*a* and the third data network telephone 218*a*, where the packets could be disassembled. The third PID 220*a* could then request the graphical data containing the map information from the third data network telephone 218*a*. The third data network telephone 218*a* could then transmit the map information across the link 219*a* to the third PID 220*a*, where it could be integrated with the notes taken by UserC in the note portion 918. Although links 209*a*, 209*b*, and 218*a* are shown in FIG. 9, the links need not be utilized during much of the note-taking session unless user data is being transmitted across the network 900, call information is being requested or received, or a call is being setup (or torn down).

Figure 10:
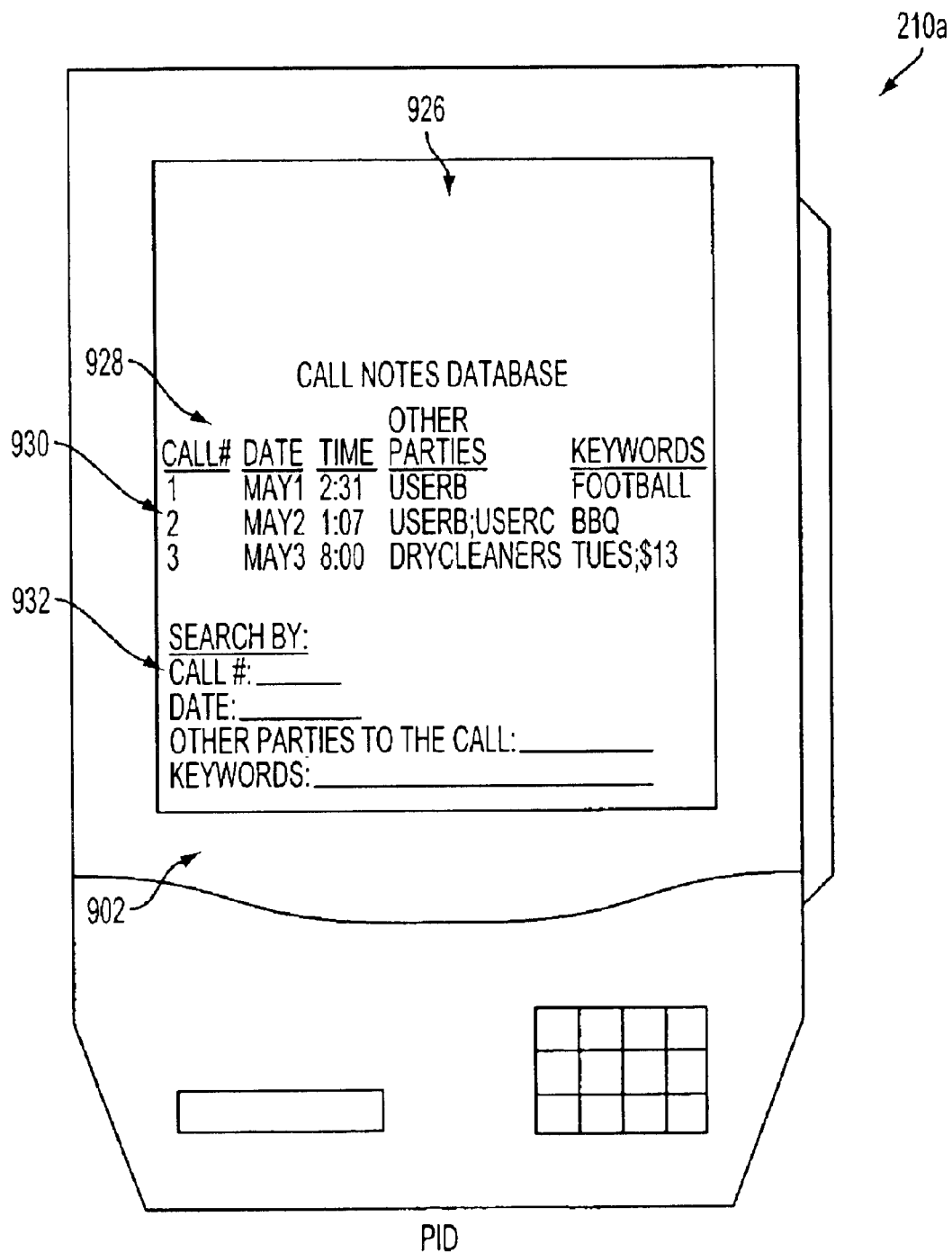
FIG. 10 is a pictorial diagram showing a PID screen display of a call notes database application according to an exemplary embodiment of the present invention.

FIG. 10 is a PID diagram showing an exemplary call notes database application 926 according to one embodiment of the present invention. The PID 210*a* may display output from the call notes database application 926 on the display screen 902. Included within the exemplary call notes database application 926 are a call record list 928 and a search engine 932. The call record list 928 is shown as having headers relating to the call number, the date, the time, other parties to the call, and keywords relating to the call. Three calls are listed in the call record list 928, including the call illustrated in FIG. 9, which is call number two in the call record list 928. Call number two can be selected by UserA of the first PID 210*a* to display the notes 914 that were taken during the call. The search engine 932 allows UserA to search the call notes database by entering a call number, the date (or time) of a call, other parties to the call, or keywords, for example. The keywords field within the call notes database may require handwriting recognition processing if UserA enters the call notes via handwriting by using a stylus, for example. Alternatively, UserA may be able to specify identifying keywords as part of the note-taking process. The call notes database 926 is merely one example of an application that may be used with the notes associated with the network telephony call according to aspects of the present invention. Other types of applications are also intended to be within the scope of the present invention.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for associating notes to a network telephony call comprising:
    a data network to provide data connectivity for a plurality of data communications channels using data transport protocols;
    first and second data network telephones connected to the data network, each data network telephone operable to communicate a voice signal as voice-over-data packets on a voice-over-data channel, the voice over data channel being one of the plurality of data communications channels on the data network, the data network telephones operable to convert voice-over-data packets communicated on the voice-over-data channel to voice signals, each data network telephone operable to provide call information; and
    a first portable information device operable to record call information, the first portable information device registered to the first data network telephone and comprising a first user interface and a first data network telephone interface, the first user interface operable to accept PID data entered by a first user, the first data network telephone interface operable to communicate PID data to and from the first data network telephone; the first portable information device receiving call information from the first data network telephone; and
    a second portable information device operable to record call information, the second portable information device registered to the second data network telephone and comprising a second user interface and a second data network telephone interface, the second user interface operable to accept PID data entered by a second user, the second data network telephone interface operable to communicate PID data to and from the second data network telephone, the second portable information device receiving call information from the second data network telephone;
    wherein each data network telephone is operable to communicate PLD data as PID data packets on a PID data channel, the PID data channel being one of the plurality of data communications channels on the data network, the first data network telephone operable to communicate PID data to and from the first portable information device, the second data network telephone operable to communicate PID data to and from the second portable information device, the data network telephones operable to convert PID data packets communicated on the PID data channel to PID data.

2. The system of claim 1 wherein:
    at least a first and second user communicate on the voice-over-data channel and a graphical data channel, each user identified by a user identifier that includes a unique sequence of alpha numeric elements.

3. The system of claim 2 wherein each data network telephone includes a device identifier that corresponds to the user identifier.

4. The system of claim 3 wherein the device identifiers include Internet Protocol (IP) addresses.

5. The system of claim 3 wherein the user identifiers include Session Initiation Protocol (SIP) addresses.

6. The system of claim 3 wherein the user identifiers include E.164 telephone numbers.

7. The system of claim 1 further comprising:
    a network telephony user database connected to the data network to store a user identifier and a telephone identifier corresponding to the user identifier for each of a plurality of users, wherein:
        the user identifier includes a first sequence of alphanumeric elements that identify a corresponding user;
        the telephone identifier includes a second sequence of alphanumeric elements that identifies a corresponding data network telephone; and
        a network telephony connection server operable to receive a request message from the first data network telephone to initiate the voice over data channel and the PID data with the second data network telephone, and to send a response message in response to the request message.

8. The system of claim 7, wherein the response and request messages are communicated by the network telephony connection server in accordance with the Session Initiation Protocol (SIP).

9. The system of claim 7, wherein the response and request messages are communicated by the network telephony connection server in accordance with the H.323 Protocol.

10. The system of claim 7 wherein the response and request messages are communicated by the network telephony connection server in accordance with the MEGACO protocol.

11. The system of claim 7 wherein the response and request messages are communicated by the network telephony connection server in accordance with the MGCP protocol.

12. The system of claim 7 wherein:
    the request message includes a callee user identifier; and
    wherein the network telephony connection server determines the telephone identifier for the callee user identifier and includes the telephone identifier in the response message.

13. The system of claim 7 wherein:
    the request message includes a callee user identifier; and
    wherein the network telephony connection server determines the telephone identifier for the callee identified in the callee user identifier and sends the response message to the callee at the telephone identifier.

14. The system of claim 1 wherein the first and second data network telephones include a wireless transmitting means and a wireless receiving means to communicate with the first portable information device and the second portable information device.

15. The system of claim 1 wherein the first portable information device and the second portable information device include a wireless transmitting means and a wireless receiving means to communicate with the first and second data network telephones.

16. A method of associating notes with portable information devices (PID) on a network telephony call comprising in combination:
    coupling a first and a second data network telephone to a data network;
    coupling a first PID to the first data network telephone;
    coupling a second PID to the second data network telephone;
    sending PID data from the first PID to the first data network telephone;
    transferring the PID data from the first data network telephone through the data network to the second data network telephone;
    sending the PID data from the second data network telephone to the second PID;
    receiving the PID data at the second PID;
    creating a call record on a display of each of the first PID and the second PID.

17. The method of claim 16 further comprising transmitting call record information from the first data network telephone and the second data network telephone to the first PID and the second PID.

18. The method of claim 17 further comprising synchronizing the call record information and the notes with a computer to allow a user to access the call record information and the notes on the computer.

19. The method of claim 16 wherein the PID data is selected from the group consisting of graphical data and voice data.

20. The method of claim 16 wherein the PID data is data selected from the group consisting of data entered on a touch sensitive display of the first PID and data from a memory associated with the first PID.

21. The method of claim 16 wherein the data network is selected from the group consisting of a Wide Arca Network (WAN), a Local Area Network (LAN), a cable network, and Internet.

22. The method of claim 16 wherein transferring the PID data from the first data network telephone through the data network to the second data network telephone includes transferring the PID data through the data network using a router.

23. The method of claim 16 wherein coupling the first PID to the first data network telephone and coupling the second PID to the second data network telephone includes coupling using a connection selected from the group consisting of a wireless bluetooth communication, a wireless infrared link, a wireless radio frequency link and a hard-wired connection.

24. A system for associating notes to a network telephony call comprising:

a data network operable to provide data connectivity for a plurality of data communications channels using data transport protocols;

first and second data network telephones connected to the data network, each data network telephone operable to communicate a voice signal as voice-over-data packets on a voice-over-data channel, the voice over data channel being one of the plurality of data communications channels on the data network;

a first portable information device operable to record call information, the first portable information device registered to the first data network telephone; and a second portable information device operable to record call information, the second portable information device registered to the second data network telephone, wherein each data network telephone is operable to communicate PID data as PID data packets on a PID data channel, the PID data channel being one of the plurality of data communications channels on the data network.

25. The system of claim 24 wherein each data network telephone is operable to convert voice-over-data packets communicated on the voice-over-data channel to voice signals.

26. The system of claim 24 wherein each data network telephone is operable to provide call information.

27. The system of claim 24 wherein the first portable information device and the second portable information device include a user interface and a data network telephone interface.

28. The system of claim 27 wherein the user interface is operable to accept PID data entered by a user and the data network telephone interface is operable to communicate the PID data to and from each data network telephone.

29. The system of claim 24 wherein the first data network telephone is operable to communicate PLD data to and from the first portable information device and the second data network telephone is operable to communicate PID data to and from the second portable information device, wherein each data network telephone is operable to convert PID data packets communicated on the PID data channel to PID data.

* * * * *